United States Patent
Zhang

(10) Patent No.: US 8,651,514 B2
(45) Date of Patent: Feb. 18, 2014

(54) AIRBAG TEAR SEAM TAPE

(75) Inventor: David Zhang, Bloomfield, MI (US)

(73) Assignee: Faurecia Interior Systems, Inc., Auburn Hills, MI (US)

(*) Notice: Subject to any disclaimer, the term of this patent is extended or adjusted under 35 U.S.C. 154(b) by 0 days.

(21) Appl. No.: 13/444,486

(22) Filed: Apr. 11, 2012

(65) Prior Publication Data
US 2013/0270801 A1    Oct. 17, 2013

(51) Int. Cl.
*B60R 21/2165* (2011.01)
*B32B 37/14* (2006.01)

(52) U.S. Cl.
USPC .................. 280/728.3; 156/160; 280/732

(58) Field of Classification Search
CPC .................................................... B60R 21/205
USPC .............. 280/728.3, 732; 156/160, 163, 229, 156/290, 291, 292
See application file for complete search history.

(56) References Cited

U.S. PATENT DOCUMENTS

| | | | | |
|---|---|---|---|---|
| 3,121,021 A * | 2/1964 | Copeland | ...................... | 428/219 |
| 3,364,063 A * | 1/1968 | Donatas | ...................... | 442/151 |
| 3,503,495 A * | 3/1970 | Gustafson et al. | ............. | 428/153 |
| 3,908,650 A * | 9/1975 | Dunshee et al. | ................. | 602/58 |
| 4,427,737 A * | 1/1984 | Cilento et al. | ............. | 428/315.7 |
| 5,082,310 A | 1/1992 | Bauer | | |
| 5,246,773 A * | 9/1993 | Mamish | ........................... | 442/71 |
| 5,533,748 A | 7/1996 | Wirt et al. | | |
| 5,590,901 A * | 1/1997 | MacGregor | ................. | 280/728.3 |
| 5,775,727 A * | 7/1998 | Sun et al. | .................... | 280/728.3 |
| 5,997,030 A | 12/1999 | Hannert et al. | | |
| 6,410,464 B1 * | 6/2002 | Menzies et al. | ............... | 442/151 |
| 6,457,739 B1 * | 10/2002 | Dailey et al. | ............... | 280/728.3 |
| 6,644,685 B2 | 11/2003 | Sun et al. | | |
| 6,657,158 B1 | 12/2003 | Skelly et al. | | |
| 7,100,941 B2 | 9/2006 | Riha et al. | | |
| 7,625,004 B2 | 12/2009 | Geltinger et al. | | |
| 7,798,518 B2 | 9/2010 | Kornylo et al. | | |
| 7,862,071 B2 * | 1/2011 | Hou et al. | .................. | 280/728.3 |

(Continued)

FOREIGN PATENT DOCUMENTS

| | | |
|---|---|---|
| CA | 2650565 | 11/2007 |
| DE | 10001246 A1 | 7/2001 |

(Continued)

OTHER PUBLICATIONS

3M™ Adhesive Transfer Tape 9485PC, Miscellaneous Custom Sizes 1/2 in or greater, available at http://solutions.3m.com/wps/portal/3M/en_US/Adhesives/Tapes/Products/?N=4294957499+5000130&Nr=AND(hrcy_id%3AGSMQX7FLQVgs_79ZHRBQ2ZR_N2RL3FHWVK_GPD0K8BC31gv)&rt=d (Printed May 15, 2013).*

(Continued)

*Primary Examiner* — Joseph Rocca
(74) *Attorney, Agent, or Firm* — Reising Ethington P.C.

(57) ABSTRACT

A vehicle interior panel for use over an airbag includes a covering disposed over a substrate. The covering includes a decorative layer with an inner surface that faces the substrate and an opposite decorative surface. A non-visible tear seam is formed at the inner surface of the decorative layer. Tear seam tape is attached to the inner surface of the decorative layer along at least a portion of the tear seam to hold the decorative layer together at the tear seam. The tear seam tape can help prevent the tear seam from becoming visible at the decorative surface.

18 Claims, 2 Drawing Sheets

(56) References Cited

U.S. PATENT DOCUMENTS

| | | |
|---|---|---|
| 7,989,052 B2 | 8/2011 | Hehn et al. |
| 2002/0042235 A1 | 4/2002 | Ueno et al. |
| 2003/0011174 A1 | 1/2003 | Merrifield et al. |
| 2003/0066586 A1 | 4/2003 | Blockhaus et al. |
| 2004/0164531 A1 | 8/2004 | Riha et al. |
| 2004/0195814 A1 | 10/2004 | Muller et al. |
| 2005/0215143 A1 | 9/2005 | Hehn et al. |
| 2007/0252364 A1* | 11/2007 | Kornylo et al. ............ 280/728.3 |
| 2009/0243264 A1* | 10/2009 | Kaulbersch ................ 280/728.3 |

FOREIGN PATENT DOCUMENTS

| | | |
|---|---|---|
| DE | 10240439 A1 | 3/2004 |
| DE | 102005013477 | 10/2006 |
| DE | 102005017124 A1 | 10/2006 |
| EP | 1705076 | 9/2006 |
| WO | WO 9703866 A1 * | 2/1997 |

OTHER PUBLICATIONS

3M Adhesive Transfer Tapes with Adhesive 350 9442 o 9445 o 9482PC o 9485PC o 9485EK o 9675 Technical Data Sep. 2002.*

Grams per square yard to Ounce Per Square Yard Conversion, Google Conversion (Printed May 16, 2013).*

Convert mils to mm—Conversion of Measurement Units (Printed May 16, 2013).*

European Search Report for application EP 13 16 0519, dated Jul. 4, 2013, 2 pages.

* cited by examiner

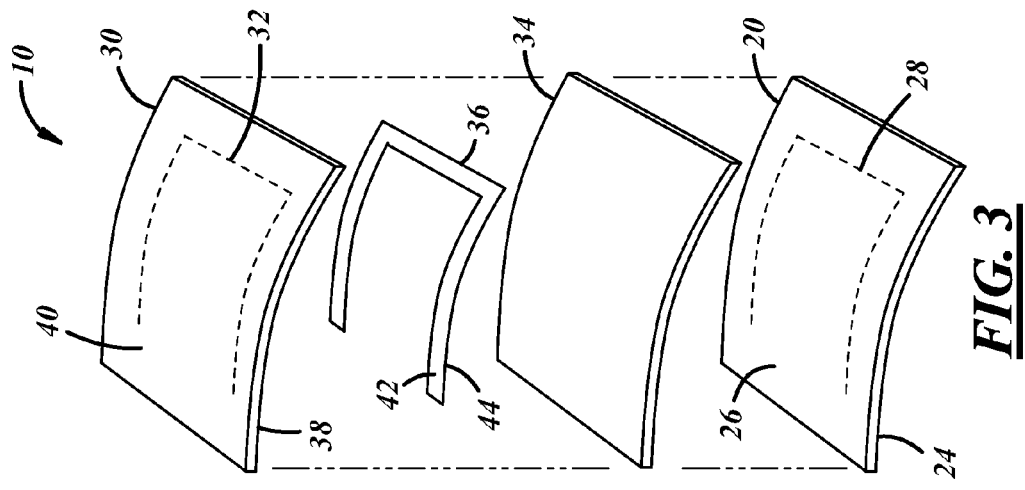
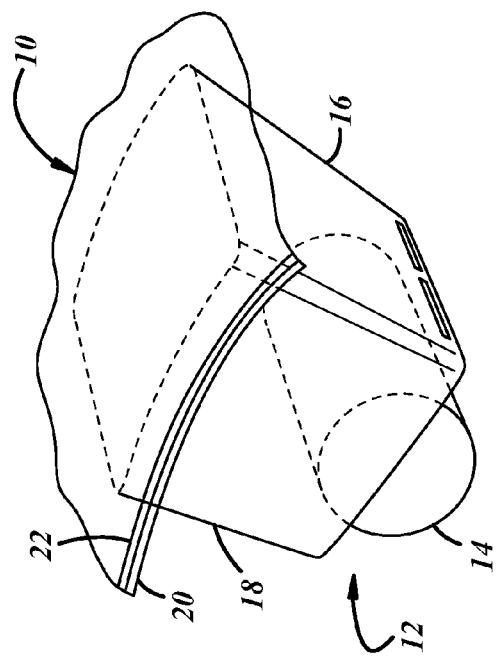
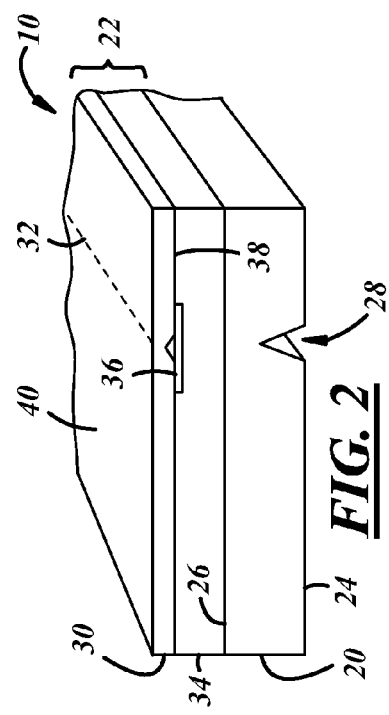

AIRBAG TEAR SEAM TAPE

TECHNICAL FIELD

The present disclosure relates generally to vehicle interior panels and coverings having tear seams for use over vehicle airbags.

BACKGROUND

Vehicle airbags are safety devices that deploy toward the interior of a vehicle to help protect its occupants from injury in the event of a crash. Airbags may be concealed behind or beneath an interior panel during normal vehicle operation until such an event. When the airbag deploys, it typically does so through a deployment opening formed in or around the interior panel. The deployment opening may be pre-formed in the panel, the panel may move away to reveal the opening, or the opening may be formed during airbag deployment at a predetermined location in the panel. Where formed during deployment, a tear seam may be provided in one or more components of the panel to at least partially define the predetermined location of the opening.

U.S. Pat. No. 7,989,052 to Hehn et al. describes an airbag cover for a motor vehicle having a decor layer and a spacer mesh, each with a weakening for deploying an airbag. The weakening is formed in both the decor layer and the spacer mesh on a side which faces a folded airbag. An intermediate layer is positioned between the decor layer and the spacer mesh and is made of material that is relatively resistant to tensile forces, but has low tear resistance to forces acting perpendicular to its plane.

SUMMARY

According to one embodiment, a panel is provided for use over a vehicle airbag. The panel includes a substrate having an outer surface and a decorative layer disposed over the outer surface of the substrate. The decorative layer includes an inner surface that faces toward the substrate. A tear seam is formed in the inner surface of the decorative layer at a predetermined airbag deployment opening location. The panel also includes tear seam tape attached to the inner surface of the decorative layer along at least a portion of the tear seam, and the tear seam tape is shaped to fit the tear seam.

In one embodiment, the tear seam tape is made of a material having polymer fibers randomly oriented in the plane of the tear seam tape.

In another embodiment, the tear seam tape is perforated.

In another embodiment, the tear seam tape has a first edge and an opposite second edge which are not rectilinear.

In another embodiment, the tear seam tape has an area density of about one ounce or less per square yard and a thickness ranging from about 0.05 mm to about 0.15 mm.

In another embodiment, the decorative layer has a residual wall thickness at the tear seam that is about 50% or less than a nominal thickness of the decorative layer.

In another embodiment, the decorative layer is made of leather or simulated leather and has a thickness ranging from about 0.5 mm to about 2.0 mm.

In another embodiment, the panel includes an intermediate layer between the substrate and the decorative layer such that the tear seam tape is between the decorative layer and the intermediate layer, and the intermediate layer does not include a tear seam.

In accordance with another embodiment, a method is provided for making a panel for use over a vehicle airbag. The method includes the steps of: (a) attaching a strip of tear seam tape to an inner surface of a decorative layer along at least a portion of a tear seam formed in the decorative layer; (b) attaching an intermediate layer to the inner surface of the decorative layer such that the tear seam tape is sandwiched between the decorative layer and the intermediate layer; and (c) disposing the decorative layer with the tear seam tape and the intermediate layer over a substrate.

In another embodiment, the method includes adhesively attaching the tear seam tape to the decorative layer with a pressure sensitive adhesive.

In another embodiment, the method includes attaching the intermediate layer with an adhesive material that penetrates at least a portion of the tear seam tape.

In another embodiment, the adhesive material penetrates the tear seam tape through perforations formed through the tear seam tape.

In another embodiment, the adhesive material penetrates the tear seam tape through the thickness of the tear seam tape.

In another embodiment, the method includes attaching more than one strip of tear seam tape to the inner surface of the decorative layer along the tear seam.

In another embodiment, the method includes attaching the tear seam tape to a leather decorative layer.

In another embodiment, the method includes attaching tear seam tape made of a non-woven material that is resistant to wrinkling.

DESCRIPTION OF THE DRAWINGS

One or more embodiments will hereinafter be described in conjunction with the appended drawings, wherein like designations denote like elements, and wherein:

FIG. 1 is a cutaway view of an illustrative vehicle interior panel over an airbag module;

FIG. 2 is a cross-sectional view of a vehicle interior panel, showing tear seam tape arranged along a tear seam;

FIG. 3 is an exploded view of a vehicle interior panel of, showing tear seam tape for attachment to the decorative layer;

DETAILED DESCRIPTION

Figure 4:
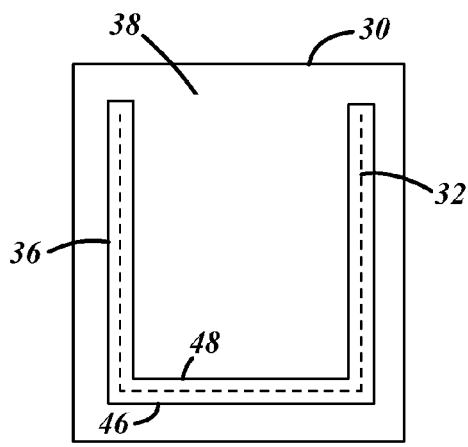
FIG. 4 is a view of an inner surface of a decorative layer with a strip of tear seam tape attached along a tear seam.

As will be apparent from the following disclosure, airbag coverings with non-visible tear seams may include tear seam tape to hold a decorative layer together at a tear seam formed in an inner surface of the decorative layer. The tear seam tape can help prevent the tear seam from becoming visible at a decorative side of the covering over time, when the covering may be subjected to temperature extremes, for example. It is noted that the appended drawings are not necessarily to scale and that some features may be exaggerated or omitted for purposes of clear illustration.

Referring now to FIG. 1, a cut-away view of a portion of a vehicle interior panel 10 is shown with a passenger-side airbag module 12 installed therebeneath. A vehicle passenger-side airbag is shown only as an example of one type of airbag that may benefit from the following disclosure. For example, the airbag module 12 may include any component or device with an airbag configured to deploy into a cabin of a vehicle when inflated. In this embodiment, the airbag module 12 includes an airbag canister 14 and a housing 16. The airbag is configured to deploy from the canister 14 toward the panel 10 and into the vehicle cabin when necessary. The housing 16 supports the airbag canister 14 beneath the interior panel 10 and a portion of the housing 16 may act as a chute 18 which guides the airbag during deployment. Other types of airbag modules may not include a canister or a separate housing and may include other types of components to compliment the functionality of the airbag.

As shown in the cross-section of FIG. 2, the vehicle interior panel 10 includes multiple layers of materials. This example includes a substrate 20 and a multi-layer covering 22 overlying the substrate 20. The substrate 20 is the base structural component of the interior panel 10 and includes inner and outer surfaces 24 and 26. The illustrated substrate 20 includes a line of weakening 28 in the form of a groove at the inner surface 24 to at least partly define an airbag deployment opening location. The covering 22 may be provided for decorative purposes and may include a decorative layer 30 having a non-visible tear seam 32 formed therein and an intermediate layer 34 that lies between the substrate 20 and the decorative layer 30. The panel 10 also includes a strip of tear seam tape 36 attached to the decorative layer 30 and sandwiched between the decorative layer 30 and the intermediate layer 34. More specifically, the tear seam tape 36 is attached to an inner surface 38 of the decorative layer 30 along the tear seam 32 to help prevent the location of the tear seam 32 from showing at an opposite decorative surface 40. In one embodiment, the intermediate layer 34 is omitted so that the decorative layer 30 is the covering, and other embodiments include additional layers of material.

The line of weakening 28 and the tear seam 32 determine the location of the airbag deployment opening. During airbag deployment, the airbag exerts pressure at the inner surface 24 of the substrate 20. In response to such pressure, the multiple layers of the panel 10 collectively tear open along the line of weakening 28 and the tear seam 32 to form an airbag deployment opening through the panel 10. The terms "tear seam" and "line of weakening" may be used interchangeably and can be formed in a layer of material by making various types of holes, cuts, scores, notches, or other stress concentrators in the layer that extend at least partially through the layer. Laser scoring, machining, hot or cold knife cutting, or rotary knife cutting are examples of methods that can be used to form a tear seam. Some types of panel materials may not require a tear seam in order to tear along with the other layers of the panel during airbag deployment. For example, the intermediate layer 34 of the example shown in FIG. 2 does not include a tear seam or line of weakening. However, the intermediate layer 34, and any one or more of the other panel layers, also may include one or more lines of weakening for the formation of an airbag deployment opening therethrough.

FIG. 3 is an exploded view of one embodiment of the vehicle interior panel 10 separately showing the substrate 20, the decorative layer 30, the intermediate layer 34, and the tear seam tape 36. The substrate 20 determines the overall shape of the interior panel 10 and supports the overlying layers. The line of weakening 28 may be formed as described above, or it may be molded-in to the substrate. It one embodiment the line of weakening 28 includes a continuous or discontinuous slot formed through the substrate. In another embodiment, the substrate 20 or the underlying airbag module may include a pre-formed airbag door which may swing open during airbag deployment. The substrate can be made from any suitable material such as a filled or unfilled thermoplastic material, in which case it may range in thickness from about 2.0 mm to about 4.0 mm.

The decorative layer 30 may be constructed from a relatively pliable material for a desired look and feel. Leather, simulated leather or other polymer materials such as PUR or PVC are examples of suitable materials. The inner surface 38 faces toward the substrate 20, and the opposite decorative surface 40 is the visible external surface of the interior panel 10. In one embodiment, the decorative layer 30 may have a thickness ranging from about 0.5 mm to about 2.0 mm, and preferably from about 0.75 mm to 1.5 mm. In another embodiment, the thickness of the decorative layer may be about 1.0 mm, or range from about 0.9 mm to about 1.1 mm.

The tear seam 32 is a non-visible tear seam, meaning that it is formed in the decorative layer so that its location is not apparent when the covering 22 is viewed by a vehicle occupant. The illustrated tear seam 32 is generally U-shaped and located to correspond with the line of weakening 28 in the substrate. The tear seam 32 and/or the line of weakening 28 may assume other known shapes, such as a rectangular shape, H-shape, or X-shape, to name a few examples. As noted above, the tear seam 32 may include one or more cuts, scores, notches or stress concentrators which extend from the inner surface 38 into the decorative layer 30. For example, the tear seam 32 may extend into the decorative layer at a depth corresponding to 50% to 70% of the total thickness of the decorative layer 30. In other words, if the decorative layer 30 has a nominal thickness of 1.0 mm, the tear seam 32 may extend into the decorative layer at a depth of about 0.5 mm to about 0.7 mm so that the decorative layer 30 has a residual wall thickness of about 0.3 to about 0.5mm at the tear seam 32.

The tear seam tape 36 includes a tear seam side 42 facing the tear seam 32 and an opposite side 44 facing toward the substrate 20 and/or the intermediate layer 34. The tear seam tape 36 may be shaped to fit the tear seam 32, as shown. For example the tear seam tape 36 in FIG. 3 is U-shaped like the tear seam 32. A strip form of tear seam tape 36 facilitates application of the tape 36 only where needed to help prevent read-through of the tear seam 36 at the decorative surface 40 of the decorative layer 30. In other words, the tear seam tape does not necessarily have to be present along the entire tear seam 32 or along portions of the decorative layer 30 away from the tear seam 32. The tear seam tape 36 may prevent discernible read-through of the tear seam 36 even after the panel 10 has been exposed to thermal and/or mechanical stresses (other than the stresses that occur during airbag deployment). For example, it has been found that the tear seam tape 36 can prevent discernible read-through of the tear seam 32 after the interior panel 10 has been aged at various temperatures ranging from −35° C. to 100° C. in air having humidity levels of up to 95%. The tear seam tape 36 may prevent read-through of the tear seam 32 by holding the decorative layer 30 together at the tear seam 32 during expansion and contraction of the decorative layer 30 during exposure to different temperatures. Various embodiments of tear seam tape 36 will be described in further detail below.

The intermediate layer 34 may provide a softer tactile feel to the covering 22 and to the overall interior panel 10 than would be provided if the decorative layer 30 was in direct contact with the substrate 20, which may be more rigid. The intermediate layer 34 may be attached to the decorative layer 30 after the tear seam tape 36 is attached to the decorative layer. The intermediate layer 34 may be constructed from one or more compressible but resilient materials. Various types of natural or synthetic materials can be used for the intermediate layer 34. In one embodiment, the intermediate layer 34 is made of three-dimensional (3D) fabric, which is a fabric with a relatively irregular or rough surface that can be useful with natural decorative layers such as leather. The intermediate layer 34 may have a thickness ranging from about 1.0 to about 5.0 mm, preferably from about 2.5 to about 3.5 mm. In one embodiment the intermediate layer 34 is 3D polyester fabric with a thickness ranging from about 2.7 mm to 3.3 mm, or about 3 mm. As already noted, the intermediate layer may be selected so that it does not require a line of weakening or tear seam.

FIGS. 4-9 illustrate different embodiments of tear seam tape 36 attached to the inner surface of the decorative layer 30 prior to being disposed over the substrate and/or prior to attachment of the intermediate layer. Generally, the tear seam tape 36 is provided in strip form so that it can be shaped to fit the tear seam 32 and may be adhesively attached to the inner surface 38 of the decorative layer 30. In one embodiment, a pressure-sensitive adhesive material is pre-applied as a film to the tear seam side 42 (shown in FIG. 3) of the tear seam tape 36. The adhesive material may be a thermoplastic adhesive material and may be applied to the inner surface 38 and/or the tear seam side of the tear seam tape 36 prior to attachment.

The tear seam tape 36 may be made from a variety of materials and may have one or more of the following characteristics. For example, the tear seam tape 36 may be resistant to wrinkling during assembly of the vehicle interior panel. In one embodiment, the tear seam tape 36 is made from a material with a basis weight or area density of about 1.0 ounce per square yard (oz./sq. yd.) or less. The basis weight of the material may be about 0.5 oz./sq. yd., or it may range from about 0.4 oz./sq. yd. to 0.6 oz./sq. yd. In another embodiment, the tear seam tape has a thickness of about 0.2 mm or less, and preferably has a thickness from about 0.1 mm to about 0.15 mm. It has been found that tear seam tape made from materials according to these area density ranges and/or thickness ranges are sufficiently resistant to wrinkling during assembly, though there may be other sufficiently wrinkle-resistant materials outside these ranges. In addition, these relatively low thickness materials may help prevent the tear seam tape from showing through at the decorative surface of the covering. Other desirable properties may include a high strength to weight ratio and thermal and dimensional stability in the range of temperatures normally encountered in the cabin of an automotive vehicle.

In one embodiment, the tear seam tape 36 is made from a material having polymer fibers randomly oriented in the plane of the tear seam tape 36. A spunbond fabric is one example of such a material, and may be produced by depositing extruded, spun filaments onto a collecting belt in random orientations followed by bonding the filaments together to form the spunbond fabric. A spunbond fabric is non-woven so that its properties may be less directional that a woven textile. A spunbond fabric is also not a solid polymer film and may thus be able to readily tear along with the tear seam 32 during airbag deployment. One example of a suitable spunbond material is Polyfab 500, a polyester spunbond fabric available from Hanes Engineered Materials. This is only one example of a suitable tear seam tape material. Other non-polyester materials may be suitable, as well as other types of non-film and/or non-woven materials.

With reference to FIG. 4, the tear seam tape 36 includes first and second edges 46 and 48 that generally follow the shape of the tear seam 32 with one edge of the tape on each side of the tear seam 32 when attached. The tear seam tape 36 may be wide enough to cover the tear seam 32 and to hold the decorative layer 30 together at the tear seam 32. In one embodiment, the tear seam tape 36 has a width, measured from the first edge 46 to the second edge 48, in a range from about 20 mm to about 30 mm, or about 25 mm. Of course, the tear seam tape may be wider or narrower and still sufficient to hold the tear seam 32 together. In the example of FIG. 4, the tear seam tape is a continuous strip of tape sized to fit over the entire length of the tear seam 32.

Figure 5:
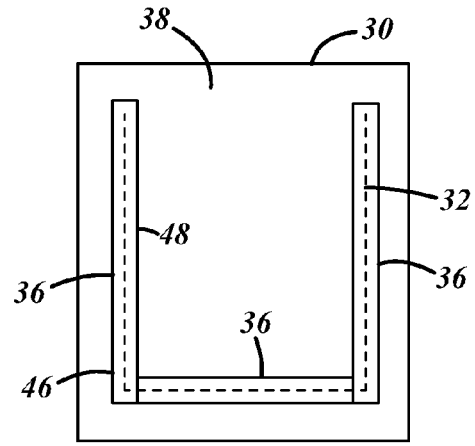
FIG. 5 is a view of the inner surface of FIG. 4 with more than one strip of tear seam tape attached along the tear seam.

FIG. 5 illustrates an example of more than one strip of tear seam tape 36 attached to the inner surface 38 of the decorative layer 30. In this particular example, three individual strips of tear seam tape 36 are attached along different portions of the entire length of the tear seam 32. Individual strips may be used, for example, where a single continuous strip of tape would tend to wrinkle where it follows changes in direction of the tear seam 32 along the inner surface 38 of the decorative layer 30.

Figure 6:
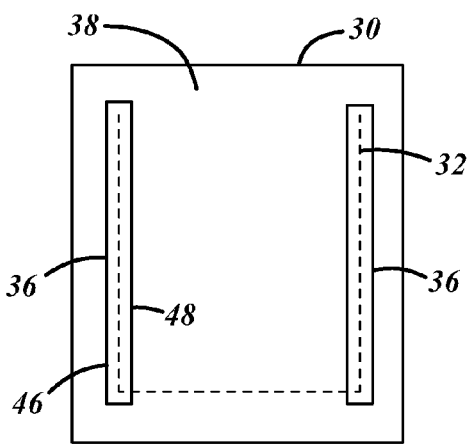
FIG. 6 is a view of the inner surface of FIG. 4 with more than one strip of tear seam tape attached along portions of the tear seam.

FIG. 6 illustrates an example of tear seam tape 36 attached to the inner surface 38 of the decorative layer 30 along only a portion of the tear seam 32. In this particular example, two individual strips of tear seam tape 36 are attached the parallel portions of the U-shaped tear seam 32. This type of configuration may be used when only certain portions of the tear seam 32 are susceptible to read-through. For example, the decorative layer 30 may be stretched or put into tension in a particular direction when attached over the substrate and tend to cause only a portion of the tear seam 32 to separate at the inner surface 38, and the tear seam tape may be attached along those portions of the tear seam 32 only.

Figure 7:
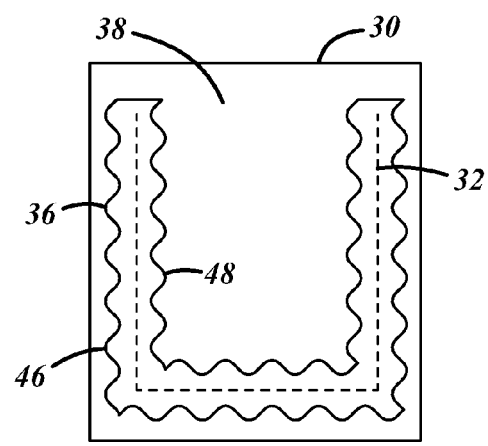
FIG. 7 is a view of the inner surface of FIG. 4 with a strip of tear seam tape having non-rectilinear edges attached along the tear seam.

In another embodiment, such as that shown in FIG. 7, the first and/or second edges 46, 48 of the tear seam tape 36 may be shaped to reduce read-through of the tear seam tape 36 on the external surface 40 of the decorative layer 30. For example, the tear seam tape 36 may be formed with first and second edges 46, 48 that are not harsh or prominent so that an outline or border of the tear seam tape 36 is not readily discernible at the decorative surface of the decorative layer 30. In one embodiment, the first and/or second edges 46, 48 of the tape 36 are not rectilinear. In the specific example of FIG. 7, the first and second edges 46, 48 of the tape are not rectilinear and follow a wavy or sinusoidal path. The tear seam tape 36 may have various other configurations, such as randomly curved edges 46, 48, intended to conceal the location of the tear seam tape 36 when the decorative layer 30 is viewed from inside the vehicle.

Figure 8:
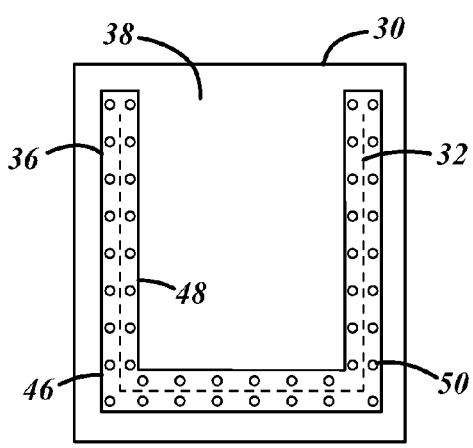
FIG. 8 is a view of the inner surface of FIG. 4 with one embodiment of perforated tear seam tape attached along the tear seam.
Figure 9:
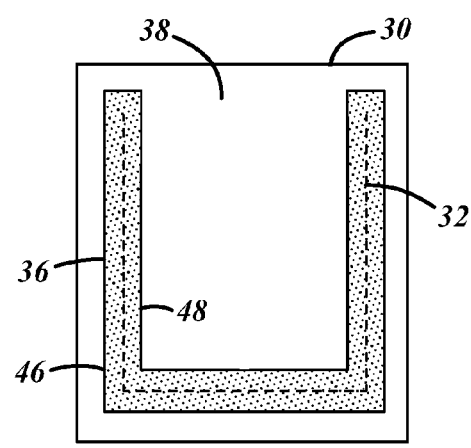
FIG. 9 is a view of the inner surface of FIG. 4 with another embodiment of perforated tear seam tape attached along the tear seam.

As shown in FIGS. 8 and 9, the tear seam tape 36 may include perforations. The embodiment of FIG. 8 includes a plurality of discrete apertures or holes 50 formed through the tape, while the embodiment of FIG. 9 includes a number of smaller perforations or pores throughout the material. Perforations can allow adhesive material to penetrate the tape 36. For example, adhesive material applied between the tear seam tape 36 and the decorative layer 30 can penetrate the tape through the perforations to adhere the decorative layer 30 to the intermediate layer, or adhesive material applied between the intermediate layer 30 and the tear seam tape 36 can penetrate the tape to do the same. In another embodiment, the tear seam tape 36 is made from a material sufficiently thin and/or porous that adhesive material can penetrate through the thickness of the tape without additional perforations.

A method of making a vehicle interior panel, for use over an airbag may be described that can be used to construct one or more of the above embodiments. An illustrative method may generally include providing a decorative layer, forming a tear seam in an inner surface of the decorative layer at a predetermined airbag deployment opening location, and attaching tear seam tape to the inner surface of the decorative layer along at least a portion of the tear seam to hold the decorative layer together at the tear seam. Thereafter, an intermediate layer may be attached to the decorative layer such that the tear seam tape is sandwiched between the decorative layer and the intermediate layer. In combination, the laminate of the decorative layer and the intermediate form a covering which may be disposed over a substrate to form the vehicle interior panel. The covering may also include one or more additional layers, or the intermediate layer may be disposed over the substrate before being attached to the decorative layer.

The step of attaching the tear seam tape may include use of a pressure sensitive adhesive, either pre-applied or applied at the time of assembly. However, other types of adhesives may be used. After adhesive application, the tear seam side of the tape may be placed in contact with the inner surface of the decorative layer along the tear seam. Thereafter, pressure may be applied to the opposite side of the tear seam tape to adhere the tear seam tape to the decorative layer. Suitable pressure may be further applied to smooth out any wrinkles which may have formed in the tape during attachment. Other steps may be included, such as heating the tape, adhesive, and/or decorative layer at various times during the process as necessary.

The intermediate layer may be adhesively attached to the decorative layer 30. In one embodiment, a thermosetting adhesive material is used to attach the decorative layer and the intermediate layer together. The adhesive material may be applied to one or both of the inner surface of the decorative layer and one side of the intermediate layer. The adhesive material may be applied by spraying a layer or coating of the adhesive material directly onto the inner surface of the decorative layer and/or onto the intermediate layer. Thereafter, the decorative layer and the intermediate layer 34 may be brought together to form the covering as a laminate. The adhesive material may penetrate at least a portion of the tear seam tape when the decorative layer is attached to the intermediate layer. Such penetration may help adhere the intermediate layer to the decorative layer, particularly at the location of the tear seam. For example, the adhesive material may penetrate one or more portions of the tear seam tape if the tape is suitably thin and/or if the tear seam tape is perforated.

Thereafter, the covering, including the laminate of the decorative layer and the intermediate layer, may be attached to the substrate. The intermediate layer may be directly attached to the substrate, or one or more other layers may be attached to the intermediate layer to form the covering. The covering may be attached to the underlying substrate by any suitable method. For example, the covering may be attached to the substrate using an adhesive. In another example, the covering may be attached to the substrate by wrapping the covering 22 around peripheral edges of the substrate and then attaching the covering to the substrate at its inner surface.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A panel for use over a vehicle airbag, comprising:
   a substrate having an outer surface;
   a decorative layer disposed over the outer surface of the substrate, the decorative layer having an inner surface that faces toward the substrate;
   a tear seam formed in the inner surface of the decorative layer at a predetermined airbag deployment opening location;
   an intermediate layer between the substrate and the decorative layer; and
   tear seam tape located between the decorative layer and the intermediate layer and attached to the inner surface of the decorative layer with an adhesive material along at least a portion of the tear seam, the tear seam tape being configured to hold the decorative layer together at the tear seam during expansion and contraction of the decorative layer during exposure to different temperatures and to tear along with the tear seam during airbag deployment;
   wherein the tear seam tape is a non-film material, and the adhesive material penetrates through the thickness of the tear seam tape to the intermediate layer.

2. A panel as defined in claim 1, wherein the tear seam tape is made of a material having polymer fibers randomly oriented in the plane of the tear seam tape.

3. A panel as defined in claim 1, wherein the tear seam tape is perforated.

4. A panel as defined in claim 1, wherein the tear seam tape has a first edge and an opposite second edge which are not rectilinear.

5. A panel as defined in claim 1, wherein the tear seam tape has an area density of about one ounce or less per square yard and a thickness ranging from about 0.05 mm to about 0.15 mm.

6. A panel as defined in claim 1, wherein the decorative layer has a residual wall thickness at the tear seam that is about 50% or less than a nominal thickness of the decorative layer.

7. A panel as defined in claim 1, wherein the decorative layer is made of leather or simulated leather and has a thickness ranging from about 0.5 mm to about 2.0 mm.

8. A panel as defined in claim 1, wherein the intermediate layer does not include a tear seam.

9. A method of making a panel for use over a vehicle airbag, comprising the steps of:
   (a) attaching a strip of tear seam tape to an inner surface of a decorative layer along at least a portion of a tear seam formed in the decorative layer; and (b) wrapping and attaching the decorative layer with the tear seam tape over a substrate such that the decorative layer is put into tension in a manner that tends to cause said at least a portion of the tear seam to separate at the inner surface, wherein the tear seam tape is configured to hold the decorative covering together at the tear seam during the step of wrapping and attaching.

10. The method of claim 9, wherein step (a) includes adhesively attaching the tear seam tape to the decorative layer.

11. The method of claim 9, further comprising the step of disposing an intermediate layer between the decorative layer and the substrate.

12. The method of claim 9, wherein an adhesive material penetrates the tear seam tape through perforations formed through the tear seam tape.

13. The method of claim 9, wherein an adhesive material penetrates the tear seam tape through the thickness of the tear seam tape.

14. The method of claim 9, wherein step (a) includes attaching more than one strip of tear seam tape to the inner surface of the decorative layer along the tear seam.

15. The method of claim 9, wherein the decorative layer of step (a) comprises a leather decorative layer.

16. The method of claim 9, wherein step (a) includes attaching tear seam tape made of a non-woven material that is resistant to wrinkling.

17. A method of making a panel for use over a vehicle airbag, comprising the steps of:

(a) forming a tear seam along an inner surface and partially through a leather decorative layer by rotary knife cutting;

(b) attaching a strip of tear seam tape to the inner surface of the leather decorative layer along the tear seam with an adhesive material, wherein the strip of tear seam tape is a non-film material configured to allow the adhesive material to penetrate through the thickness of the tear seam tape; and (c) wrapping and attaching the leather decorative layer with the attached tear seam tape over a substrate such that the decorative layer is put into tension in a manner that tends to cause at least a portion of the tear seam to separate at the inner surface, wherein the tear seam tape is configured to hold the decorative covering together at said at least a portion of the tear seam during the step of wrapping and attaching.

18. The method of claim 17, wherein the tear seam tape is a non-woven material with an area density of one ounce or less per square yard.

* * * * *